US006185565B1

(12) United States Patent
Meubus et al.

(10) Patent No.: US 6,185,565 B1
(45) Date of Patent: Feb. 6, 2001

(54) SYSTEM AND METHOD FOR COMMUNICATION SESSION DISPOSITION RESPONSIVE TO EVENTS IN A TELECOMMUNICATIONS NETWORK AND THE INTERNET

(75) Inventors: Charles J. Meubus, Westmount; Sylvain Jodoin, Montreal; Raymond Nadeau, Ile des Soeurs, all of (CA)

(73) Assignee: Nortel Networks Corporation, Montreal (CA)

( * ) Notice: Under 35 U.S.C. 154(b), the term of this patent shall be extended for 0 days.

(21) Appl. No.: 08/994,008

(22) Filed: Dec. 18, 1997

(51) Int. Cl.$^7$ ...................................................... G06F 17/30
(52) U.S. Cl. ............................................ 707/10; 707/104
(58) Field of Search .................................. 707/10, 9, 101, 707/102, 104; 379/67, 210, 220, 14, 93.07, 93.09, 219, 221, 900, 902

(56) References Cited

U.S. PATENT DOCUMENTS

| | | | |
|---|---|---|---|
| 4,942,602 | * 7/1990 | Baker, Jr. et al. | 379/212 |
| 5,274,700 | * 12/1993 | Gechter et al. | 379/210 |
| 5,442,690 | * 8/1995 | Nazif et al. | 379/207 |
| 5,533,115 | * 7/1996 | Hollenbach et al. | 379/220 |
| 5,696,809 | * 12/1997 | Voit | 379/5 |
| 5,724,406 | * 3/1998 | Juster | 379/67.1 |
| 5,793,861 | * 8/1998 | Haigh | 379/266 |
| 5,903,877 | * 5/1999 | Berkowitz et al. | 705/26 |
| 5,920,618 | * 7/1999 | Fleischer, III et al. | 379/207 |

FOREIGN PATENT DOCUMENTS

WO 96/38018 * 11/1996 (WO) .

OTHER PUBLICATIONS

Hofmann et al., "@INGate: interacting telephony and internet", Proceedinge: IEEE conference on protocols for multimedia systems, pp. 261–264, Nov. 1997.*

Simeonov et al., "@INGate: a distributed intelligent network approach to bridge switching and packet networks" Proceedings on sixth international conference on computer communications and networks, pp. 358–363, Sep. 1997.*

Perspectives on the AIN Architecture, IEEE Communications Magazine, Feb. 1992, pp. 27–32, Bellcore [Bellcore GR–1298] [Berman et al.].*

European Search Report EP 98 30 9621, Feb. 21, 2000.*

* cited by examiner

Primary Examiner—Hosain T. Alam
Assistant Examiner—Sanjiv Shah

(57) ABSTRACT

A method and a system for managing communications sessions, in accordance to events that occur in either one of a telecommunications network, such as the PSTN network or a mobile telephone network, and a data communications network such as the Internet is provided. The system includes a service logic controller supporting a data structure that holds a plurality of communication session disposition program entries. The service logic controller connects with the telecommunications network and with the data communications network through respective gateways that transmit communication session disposition inquiry messages. In response to those messages, the service logic controller retrieves the appropriate communication session disposition program and generates from that program an instruction to the entity that originated the inquiry message. The communication session is then processed according to the instruction. In a most preferred embodiment, the system also includes a conditions and events controller, that supplies information to the service logic controller regarding events or conditions prevailing in the telecommunications network that may influence the communication session disposition program.

31 Claims, 2 Drawing Sheets

SYSTEM AND METHOD FOR COMMUNICATION SESSION DISPOSITION RESPONSIVE TO EVENTS IN A TELECOMMUNICATIONS NETWORK AND THE INTERNET

FIELD OF THE INVENTION

The present invention relates to a system and method for handling communication sessions, such as telephone-related messages and electronic mail, among others that may originate from a telecommunications network or the Internet.

BACKGROUND OF THE INVENTION

A class of telephony services usually known as Single Number Service (SNS) or Personal Number Service (PNS) has been introduced in the marketplace in recent years to address mobility and call management needs of users. Their main characteristic is to provide call routing based on customer-programmed schedules. These services are usually implemented through proprietary service logic residing on either Service Control Points (SCP) in an Advanced Intelligent Network (AIN) or Intelligent Network (IN), or special purpose switch adjuncts or service nodes.

Since the introduction of these services, the telecommunications environment has significantly evolved (Internet/WWW, unified messaging) thereby increasing the events and conditions that could influence call completion decisions as well as the mechanisms available to reach the called party and the potential call delivery points.

Thus, there is a need in the industry to provide a more flexible communication session disposition mechanism that can take decisions regarding communication session disposition based on a broader range of events.

OBJECT AND STATEMENT OF THE INVENTION

An object of the invention is to provide a novel Service Logic Controller (SLC) responsive to events occurring in a telecommunications network or a data communications network to make decisions regarding the disposition of a certain communication session, such as a telephone call or electronic mail transaction.

Another object of the invention is to provide a system for the management of communication sessions, the system being capable to take communication session disposition decisions based on events occurring in a telecommunications network or a data communications network.

Another object of the invention is to provide an improved method for managing a communication session originating in either one of a telecommunications network and data communications network.

As embodied and broadly described herein, the invention provides a service logic controller for management of communication sessions originating in either one of a telecommunications network and a data communications network, the service logic controller including:

a first connection point permitting to exchange data with the telecommunications network;

a second connection point permitting to exchange data with the data communications network;

a data structure including a plurality of entries, each entry including an information element indicative of a certain call disposition program, said service logic controller being responsive to a communication session disposition inquiry message input through either one of the first and second connection points to associate a certain entry in the data structure with the communication session disposition inquiry message and output through either one of the first and second connection points a communication session disposition instruction message in accordance with the communication session disposition program of the certain entry.

Throughout this specification, the expression "communication session" is intended to encompass any session-oriented real-time or non-real time communication such as telephone-related messages, electronic mail messaging, video-conferencing, facsimile transactions and pager-related calls, SMS (Short Message Service), voice-mail, file-transfer etc.

Throughout this specification, the expression "telecommunications network" encompasses networks through which are exchanged primarily, but not exclusively, audio signals, such as the Public Switched Telephone Network (PSTN), mobile telephone networks and private telephone networks, among others.

Throughout this specification, the expression "data communications network" refers to networks that exchange primarily, but not exclusively, data such as electronic mail and file transfer, among others. Typical examples of data communications networks include networks based on the Transfer Control Protocol and Internet Protocol (TCP/IP), such as the Internet, Intranets and Extranets.

In a specific embodiment of this invention, the SLC connects with three independent network domains, namely the PSTN, a mobile telephone network and the Internet. The connection to the respective network domain is effected through gateways Each network is provided with a Detection Point Functional Element (DPFE) whose task is to detect a communication session that needs the services of the SLC. Once such communication session is detected, say a caller originates a telephone call from the PSTN, the DPFE issues a communication session disposition inquiry message through the associated gateway, directed at the SLC. When the instruction message is sent by the DPFE, the latter will typically suspend call processing pending the call disposition instructions from the SLC.

The SLC includes a data structure in the form of a database including a plurality of information elements, each information element being a user profile that contains a communication session disposition program. That program determines how a communication session is to be managed in dependence upon various factors, such as time of day, type of communication etc. In a very specific example, an illustrative script can be: "Between 9 to 5 on working days, route calls to my directory number (DN) from my customer list to my office unless my cellular phone is activated, in which case calls should be routed by the cellular phone. In all cases if my telephone is engaged through a dial-up connection with my Internet service provider, forward calls to the Voice-over-IP (VoIP) client. Route all fax calls to the Telco-provided fax store & forward server and notify me on my pager."

A Conditions and Events Controller (CEC) is coupled to the SLC to provide the latter with conditions and events information to enable the selection of the appropriate communication session disposition instruction based on the user's program. The CEC is linked to various condition agents (CA) residing in the three network domains that provide the CEC with status information on specific elements. Typically, such elements may be the status of the telephone line (busy or free) of the user in the PSTN, status of the cellular telephone of the user (activated or not activated) and the status of any dial-up connection session with an Internet service provider (session active or not active). Based on the information received from the respective CAs, the CEC builds a suitable message to pass the information to the SLC. The latter, in turn, utilizes this data to determine the proper communication session disposition in accordance with the user's profile.

The user's profile stored in the SLC may be altered to take into account updates or simply implement changes to suit the user's preferences. The modifications to the user's profile may be made through interactions with the data communications network. Most preferably, a server on the Internet supports a Service Logic Agent (SLA) that may interact with the user during a dial-up Internet connection session to store a user profile. Typically, the SLA provides a user-friendly way to build a suitable communication session disposition program. After the user profile has been built or altered, the SLA transfers the data to the SLC. The updating procedure can take the form of on demand data transfer, where the SLC initiates data exchange transactions with the SLA at periodic intervals, or the SLA may initiate an update of the SLC database when a change to the user profile is performed.

In a variant, dynamic user profile updates can also be effected during call processing. In this case, the SLC, after receiving a communication session disposition inquiry message, initiates a communication with the SLA to obtain profile-updating information. This procedure offers the advantage of effecting an update to the user profile in the SLC database only when an actual transaction involving that particular user is in progress.

The SLC may also receive data to alter the user profile from SLAs residing in the other network domains, such as the PSTN or the mobile telephone network.

Once the communication session disposition instruction is generated by the SLC, a message is assembled and transmitted to the DPFE that requested the instruction. The latter, upon receipt of the instruction manages the session accordingly.

As embodied and broadly described herein, the invention also provides a service logic controller for management of calls originating in a telecommunications network, the service logic controller including:

a first connection point permitting to exchange data with the telecommunications network;

a second connection point permitting to exchange data with the Internet;

a data structure including a plurality of entries, each entry including an information element indicative of a certain communication session disposition program;

said service controller being responsive to a communication session disposition inquiry message input through said first connection point to associate a certain entry in said data structure with the communication session disposition inquiry message and output through said first connection point an instructions message indicative of a communication session disposition instruction according to the communication session disposition program of said certain entry; and said service logic controller being responsive to data received through said second connection point from the Internet to alter information elements and associated communication session disposition programs in said data structure.

As embodied and broadly described herein, the invention provides a system for management of communications sessions originating in either one of a telecommunications network and a data communications network, the system comprising:

a service logic controller including first and second connection points;

a first gateway for establishing an interface permitting to transfer data between the first connection point and a telecommunications network;

a second gateway for establishing an interface permitting to transfer data between the second connection point and a data communications network;

a data structure in the service logic controller including a plurality of entries, each entry including an information element indicative of a certain communication session disposition program, said service logic controller being responsive to a communication session disposition inquiry message input through either one of the first and second gateways to associate a certain entry in the data structure with the communication session disposition inquiry message and output through either one of the first and second gateways a communication session instructions message in accordance with the communication session disposition program of the certain entry.

As embodied and broadly described herein, the invention also provides a method for managing a communication session originating in either one of a telecommunications network and a data communications network, the method comprising the steps of:

providing a message indicative of an incoming communication session that originates in either one of the telecommunications network and data communications network;

suspending processing of the communication session;

accessing a data structure containing a plurality of entries, each entry including an information element indicative of a certain communication session disposition program;

selecting one of the entries in the data structure;

processing the communication session in accordance with the communication session disposition program of the selected entry.

As embodied and broadly described herein, the invention also provides a method for managing a telephone service to a called station coupled to the telecommunications network, the method comprising the steps of:

providing a message indicative of an incoming call to the called station;

searching a data structure in a service logic controller to determine a call disposition program associated with the called station;

processing the incoming call in accordance with the call disposition program associated with the calling station;

transferring data from a service agent residing in the Internet network to the Service Logic Controller;

processing the data transferred from the service agent in accordance with the call disposition program associated with the called station to generate a call disposition instruction.

DESCRIPTION OF THE PREFERRED EMBODIMENT

Figure 1:
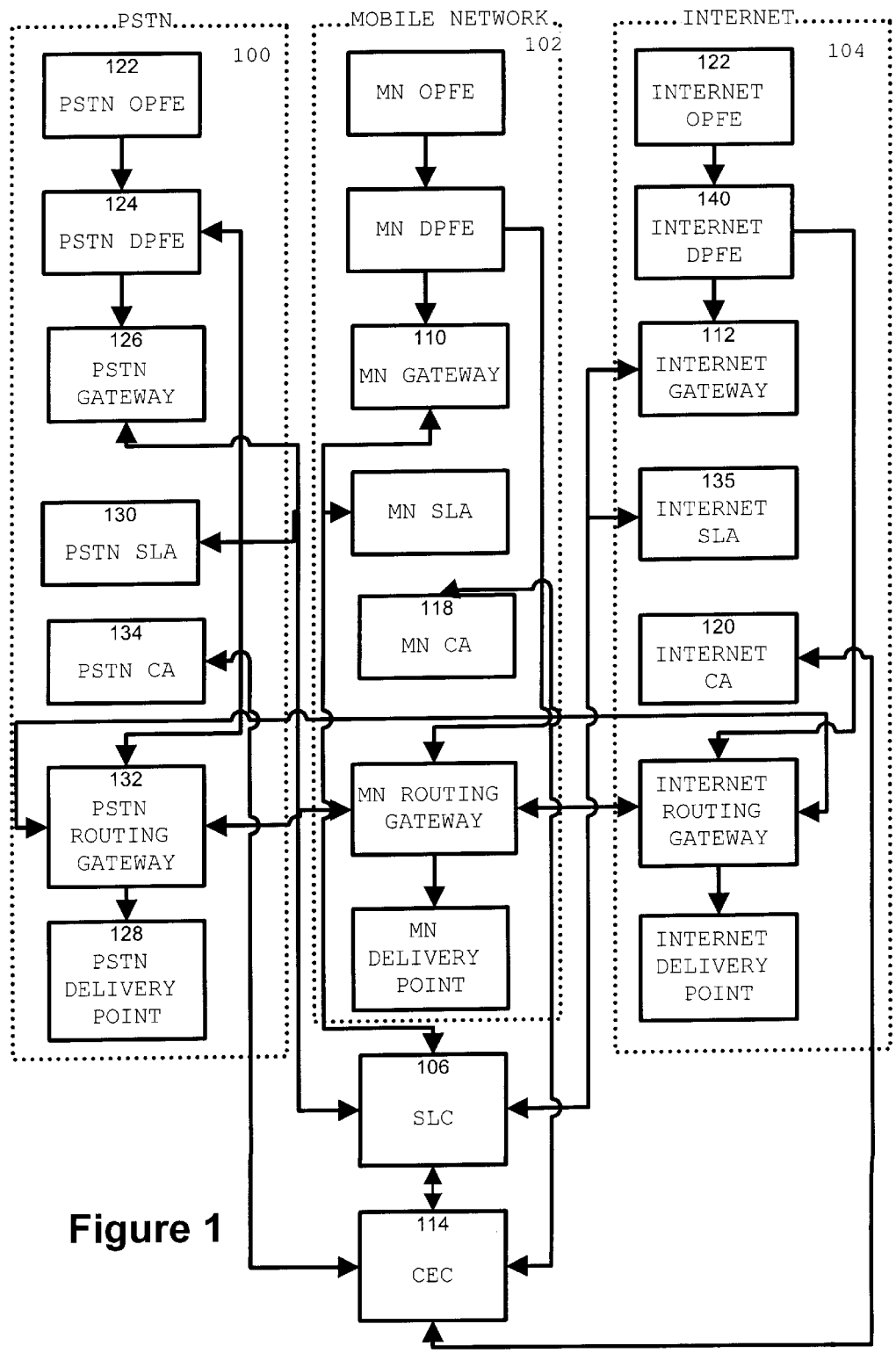
FIG. 1 is block diagram of a multi-domain communication system incorporating a communication session disposition mechanism in accordance with the invention.

FIG. 1 provides a block diagram of the various network components required by the mechanism under the present invention. The various network components and functions shown in this Figure illustrate primarily the logical relationship between these components and functions and as such may have no direct implications on the physical paths, either direct or indirect, and signaling supports used in the different implementations of this invention.

The network components are grouped in three distinct domains, namely the PSTN network domain 100, the mobile network domain 102 and the Internet domain 104. Generally speaking these domains issue and receive communications that can be telephone related messages or data. An SLC 106 connects with the respective domains through gateways 126, 110 and 112 respectively, to receive communication sessions disposition inquiry messages and to dispatch directions to the various network components as to how to manage the communication sessions. In addition, a CEC 114 is provided, that connects to respective CAs 134, 118 and 120 to obtain information on various conditions and events prevailing in the respective network domains.

The PSTN domain comprises an Originating Point Functional Element (OPFE) 122 that in essence originates a call to a certain subscriber. For example, the OPFE can be viewed as the central office to which connects the Customer Premises Equipment (CPE). The OPFE connects with a DPFE 124 that is responsible to identify call requests that require SLC 106 involvement. An illustrative embodiment of the DPFE 124 is an Advanced Intelligent Network (AIN) call model described by Bellcore [Bellcore GR-1298] [Berman et al, "Perspectives on the AIN Architecture", IEEE Communications Magazine, pp. 27–32, February 1992]. The AIN call model is implemented on a switch (SSP) and permits to:

detect calls requiring SLC 106 involvement;

suspend call processing; and send a message to an external device (the SLC 106 in this case) and wait for a response to complete the call.

The PSTN DPFE 124 in turn connects with a PSTN routing gateway 132. The objective of the PSTN routing gateway 132 is route calls from the DPFE 124 up to the PSTN delivery point 128 or other routing gateways in the mobile network or the Internet. The routing gateways of the three domains are interconnected to one another as shown in the drawing, thus allowing inter-domain call transfer. For instance, a call originating in the PSTN routing gateway 132 be passed to the routing gateway of the mobile network or of the Internet network and then transported to a suitable delivery point.

The PSTN routing gateway 132 can be implemented as a routing table in the switch that directs the call to the right entity for completing the call based on the routing information generated by the service logic. The delivery point 128 can be any functional element capable of delivering a call to the user or to any termination point. That termination point can be:

home phone/line/DN office/phone/line/DN fax modem audio/video conference any PSTN phone where the subscriber is registered messaging service Voice Messaging System (VMS)

unified/integrated messaging system

In addition to the above components that form part of a standard PSTN architecture, the PSTN network domain also incorporates a PSTN SLA 130 whose objective is to provide a platform to permit a user to alter or build a user profile. The PSTN SLA 130 can be implemented on any suitable hardware component of the PSTN that can support a database permitting a user through DTMF inputs or voice commands to alter elements of that database so as to build or modify a user profile containing a call disposition program or schedule. The SLA 130 can be implemented on a Service Control Point (SCP) in an AIN. A similar implementation in the mobile network could use the Wireless Intelligent Network (WIN) architecture developed by the Telecommunications Industry Association (TIA) standards Committee TR45.2. In the Internet 104 the SLA can be implemented as a software program written using a well-known language such as C++ or Java, running on a PC or an Internet server.

The PSTN also includes a CA 134 designed to detect events and conditions prevailing in the PSTN that can influence the call disposition decision taken by the SLC 106. The CA 134 can be implemented in software on a switch and can be accessed from other elements in the network through standardized means such as the AIN. For example, AIN permits to invoke resource monitoring capabilities on the switch to know in which state is a line, i.e. idle, busy or out of service. More specifically, the CA 134 is designed to detect in a most preferred embodiment of the invention the following conditions and events:

A) Calling line identification:

calling domain number calling name

B) Privacy indication

C) Subscriber's registered location

D) Caller line category:

emergency services (police department, hospital, fire station)

payphone hotel/motel government mobile(cellular PCS) phone

E) Call type voice fax modem

F) Local, long distance and/or toll status of incoming all

G) DTMF digits entered by caller, eg Personal Identification Number (PIN)

H) Called lines status busy no answer idle

I) Monitored lines status busy no answer idle

Figure 2:
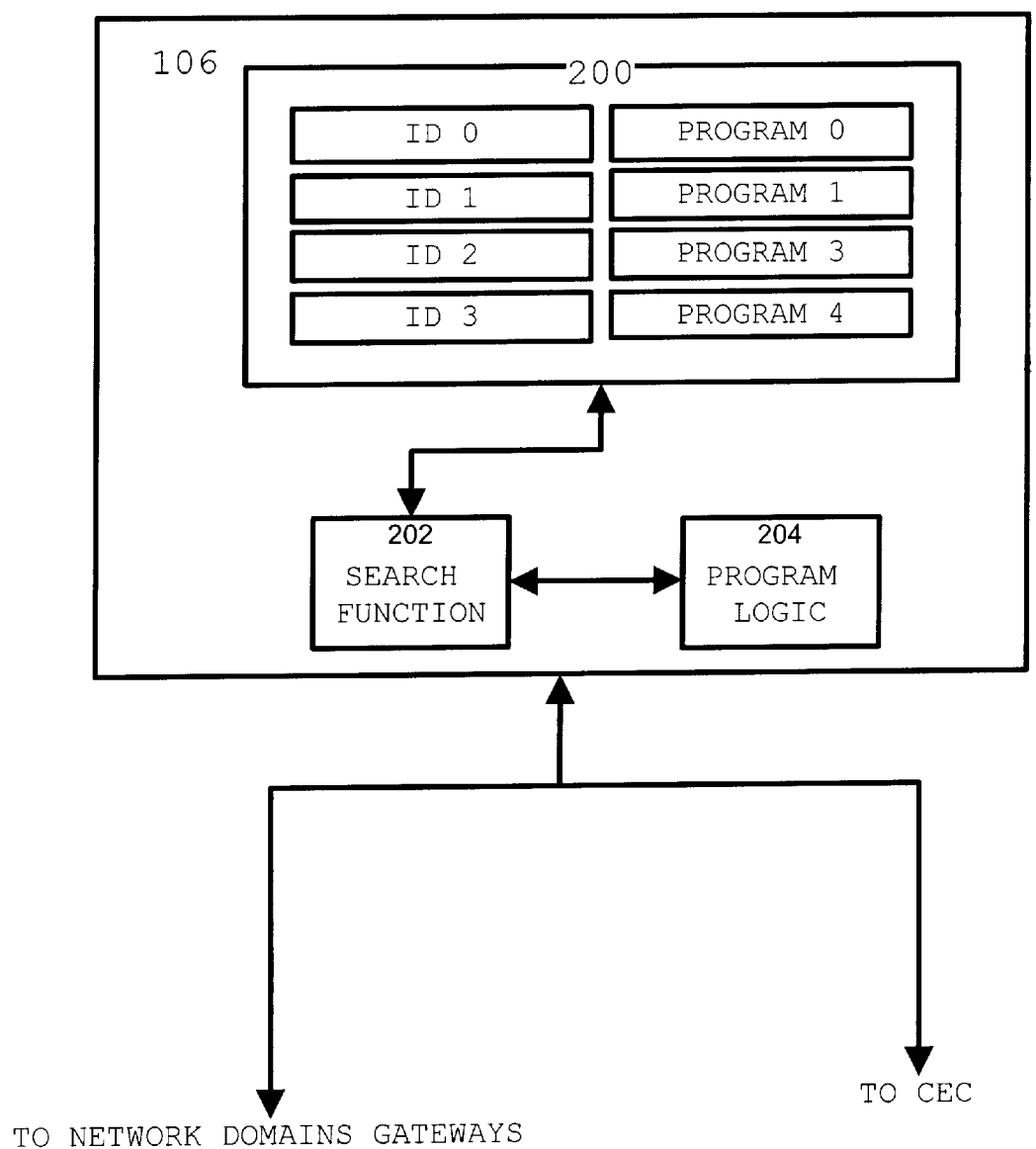
FIG. 2 is a block diagram of an SLC constructed in accordance with the invention.

J) Caled line activity log/statistics:

on-hook to off-hook state transition call attempts volume answered calls average call duration K) Monitored line(s) activity log/statistics:

on-hook to off-hook state transition call attempts volume answered calls average call duration The SLC 106 can be implemented on any suitable server that connects to the gateways 126, 110 and 112. The SLC 106 supports a database of user profiles enabling the logic to take a decision on call disposition. A block diagram of the SLC 106 is depicted at FIG. 2. The SLC 106 comprises a database 200 holding a table associating different call disposition programs with respective user identifiers. Each disposition program can be viewed as a personal schedule that defines how a call will be managed in dependence of events reported by the CEC 114 (to be described later) and other conditions such as:

A) Date and time of incoming call time of day day of week day of year

B) Business hours holidays employer's business days and hours time zones

These conditions are provided by the system while the conditions that are reported by the CEC 114 are inherent to the status and events prevailing in the various network domains.

A search functional element 202 is designed to locate the particular call disposition program. This element will be discussed later. Suffice it to say that the call disposition inquiry message generated from any one of the domains carries a user identifier, permitting the SLC 106 to locate in the database 200 the appropriate entry.

A program logic functional element 204 is designed to process the selected user program in accordance with the events and conditions established in order to generate a call disposition instruction that is then issued to the network domain that made the original call disposition inquiry.

As mentioned earlier, the SLC 106 can be implemented on a server including a memory for storage of program elements implementing the functional blocks of the search function 202 and the program logic 204, and a processor to execute those program elements. A mass storage unit should also be provided to hold the database 200.

The CEC 114 can also be implemented on a suitable server that communicates with the respective conditions agents in the network domains. The main objective of the CEC 114 is to obtain information on the various conditions and events prevailing in the respective network domains and to communicate this data to the SLC 106. One possible way to implement the functionality of the CEC 114 is to provide a system that functions on demand, in other words, generating the desired information following a request message from the SLC 106. More specifically, when the SLC 106 is invoked to determine the disposition of a call, the program logic 204 determines the events and conditions on which information is requested in order to make the suitable decision. The SLC constructs a suitable inquiry message that is addressed to the CEC 114. Upon reception of this inquiry message, the CEC 114 decodes the message and determines the conditions and events on which a report to the SLC 106 must be made. Next, the CEC 114 determines which ones of the condition agents must be interrogated in order to generate the desired response. Suitable inquiry messages are then dispatched to the respective conditions agents that, in turn, respond accordingly. The various responses are then assembled to form a suitable response message and that message is then passed to the SLC 106.

The relationship between the SLC 106 and the CEC 114 on one hand and the mobile network 102 on the other hand is similar to the case involving the PSTN 100. More specifically, the mobile network includes an originating point functional element, a detection point functional element, a gateway service agent, a conditions agent, a routing gateway and a delivery point, that are similar to those described in connection with the PSTN 100. The delivery point functional element may be implemented in the mobile network domain by the following:

phone set fax modem messaging service voice messaging system (VMS)

unified/integrated messaging system short message service (SMS)

The following is a non-exhaustive list of the events and conditions that the conditions agent in the mobile network domain may detect and report:

A) Monitored line status busy no answer idle

B) Called line activity log:

on-hook to off-hook state transition call attempts volume answered calls average call duration C) Monitored line(s) activity log:

on-hook to off-hook state transition call attempts volume answered calls average call duration D) Mobile phone (Cellular and PCS) status on/off status roaming status roaming location mobile set location As to the data communications network 104, such as the Internet, similar functional elements are also provided. In most instances, the functional elements are in the form of software implemented on various nodes of the network 104. In the case of calls originating from the internet, a call can be made from a VoIP client such as Microsoft NetMeeting (software commercialized by Microsoft, USA). When an alias (the called party telephone number or e-mail address are examples of an alias) is passed as the called party address, the VoIP client suspends call processing and sends a message to the SLC 106, through the gateway 112, in order to get the final address. The SLC checks if the supplied alias corresponds to a subscriber. If the alias can be matched to a known subscriber, the called party SLA is invoked to provide the routing information. If the called party cannot be matched to a subscriber, the SLC can ask the CEC 114 to figure out if the person is connected to the Internet. The CEC 114 would contact the CA 120 in the Internet domain that could be a server containing a list of people connected to the Internet with their current addresses; this type of service is offered by the Microsoft Internet Locator Server (ILS). If the called party is not connected to the Internet, the SLC 106 could contact the SLA in the Internet domain in order to get the IP address of a VoIP gateway closest to the called party area along with the telephone number to complete the call.

The delivery point functional element may be implemented in the Internet network domain by the following:

Voice-over-IP (VoIP)client

Internet telephone

Internet audio/video conference

E-mail

Chat server

The following is a non-exhaustive list of the events and conditions that the conditions agent in the Internet domain may detect and report:

A) Internet telephony activity

Registration status to Internet telephony/data server H.323 call attempts answered calls average call duration

VoIP call origination

B) Dial-up Internet connection status active not active

The SLA 135 is used as the main tool to allow the user to develop and configure a user profile. The SLA 135 is a software element residing in a well-known location on the Internet, in other words, having a known URL. When the user wishes to build or update his/her profile he/she accesses the URL, say through an HTTP transaction. The software may be designed to present the user with a series of dialog boxes permitting to facilitate the data entry process. In essence, the user is required to supply the information necessary to generate the call disposition program. Once this information is entered, a database for the user is built on the server supporting the software element. That database is then uploaded to the SLC 106 so the entry in the main database 200 for that particular user can be generated. Several possibilities exist to complete this procedure. A first possibility is to configure the SLC 106 to periodically upload the data from the SLA 135. In a specific example, the SLC 106 initiates at predetermined periods (say every day), a communication with the SLA 135 to upload the data it holds. Another possibility is assigning to the SLA 135 the responsibility to update the main database 200 at the SLC 106. For instance when the SLA 135 detects a change to the data it holds, then it automatically initiates a data uploading transaction with the SLC 106.

In a possible variant, the computer of the user that establishes a dial-up connection with the SLA 135 may be designed to provide an updating function that is transparent to the user. For instance, the software on the computer may be designed to detect certain data changes in a personal information manager or an agenda to determine that a user profile update is to be effected. When such event is observed, the local software initiates a communication with the LA 135 at the URL location, when a dial-up Internet session is established by the user. This allows to keep the user profile as current as possible with only limited user intervention.

The purpose of the following information flow is to illustrate the overall system behavior but it is not intended to limit the scope of the invention to this specific flow.

1. The user starts a dial-up Internet session

2. The SLA 135 is programmed to report any changes made to the user profile database to the SLC 106. Assume for the purpose of the example that the user makes a modification to his call management schedule/program.

3. The SLA 135 reports the changes to the SLC 106.

4. The CA 120 in the Internet domain reports to the CEC 114 that the user is in an active dial-up Internet session. Here the CA 120 may be the server of the Internet service provider that can detect the active session and report this condition to the CEC 114.

5. A call to the user's DN from a PSTN OP, say a pay phone is initiated.

6. The call reaches the DPFE 124 and it is identified as necessitating SLC 106 processing. The DPFE 124 suspends call processing, sends an instruction request to the SLC 106 through the gateway 126, and waits for instructions. An example of a DPFE is an AIN trigger.

7. The gateway 126 relays the DPFE 124 request to the SLC 106 in the appropriate format. That request includes the information necessary to identify the user. That information may be the telephone number dialed at the payphone.

8. The SLC 106 activates the user's call disposition program. As mentioned above, the message forwarded to the SLC 106 by the gateway 126 carries sufficient information to identify the user. Based on the data the search functional element 202 retrieves from the database the user's call disposition program and passes it to the program logic functional element 204. The call disposition program requires in the example that the SLC 106 communicates with various SLAs and obtains information from the CEC 114. For simplicity, assume in this case that the SLC 106 must communicate with one PSTN SLA.

9. The SLC 106 communicates with the PSTN SLA 130 (say the Personal Number Service (PNS)) to obtain the latest PNS update.

10. The combined SLC 106 and PNS SLA indicate that for calls from authorized callers list, payphones and emergency services and if within an active dial-up Internet session, route to Internet VoIP.

11. Caller's DN is not in authorized callers list. SLC 106 requests CEC 114 to verify nature of calling number and status of dial-up Internet session.

12. CEC 114 requests PSTN CA (such as a Line Information Database (LIDB) 134 to report on nature of the calling number. The LIDB 134 CA answers with payphone type.

13. CEC 114 answers to SLC 106 with a calling number of payphone type and dial-up Internet session status active and provides user's current IP address.

14. SLC 106 instructs PSTN DPFE 124 to route call to user's VoIP Internet Routing Gateway.

15. PSTN DPFE 124 routes call to PSTN routing gateway 132 that connects the call to the VoIP Internet routing gateway.

16. The VoIP Internet routing gateway translates the incoming call to IP format and connects it to the VoIP client of user.

An additional example will help illustrate the operation of the system in accordance with the present invention:

1. The user establishes a dial-up Internet session;

2. The user places a call over the data communication network using VoIP;

3. The call reaches the DPFE 140 and is identified as necessitating SLC 106 processing. The DPFE 140 suspends call processing, sends a query to the SLC 106 through the gateway 112 and waits for instruction. In this example the DPFE 140 is preferably software implemented on any suitable node on the Internet that is in the pathway between the originating point and the destination point of the VoIP call. The DPFE 140 recognizes the call as one requiring SLC 106 processing based on the data contained in the IP packets it receives. This information may be an alias rather than a final destination address or a flag indicating that routing processing is required. The gateway 112 relays the DPFE 140 request to the SLC 106 in the form of a call disposition inquiry message. This message includes any suitable information to enable the SLC 106 to identify the called party. In this particular case, the information may be an e-mail address. The SLC 106 activates the called party call disposition program. As mentioned above, the message forwarded to the SLC 106 by the gateway 112 carries sufficient information to identify the called party. Based on the data, the search functional element 202 retrieves from the database the called party's call disposition program and passes it to the program logic functional element 204. The call disposition program requires in the example that the SLC 106 communicates with various SLAs and obtains information from the CEC 114. For simplicity, assume in this case that the called party is connected to the Internet and that the SLC 106 routing logic indicates to route all the Internet originated calls through VoIP when this condition holds;

4. The SLC 106 requests CEC 114 to verify if the called party is currently connected to the Internet;

5. The CEC 114 queries the Internet CA 120 on the availability of the called party on the Internet. Here, the CA 120 can be implemented by software in the form of a database on a server that can determine on the basis of the query message issued by the CEC 114, the desired information. For instance, the database may contain a list of destination points (identified on the basis of e-mail address for example) and corresponding IP addresses. Thus, the CEC 114 passes in the inquiry message the e-mail address of the called party and the CA 120 queries the database to determine if call completion can be effected in the Internet domain, and in the affirmative to get the IP address of the called party. A suitable response is assembled and sent back to the CEC 114. Alternatively, the IP address may be stored in the SLC 106, that will then avoid the necessity of establishing a dialogue with the CA 120.

6. The CEC 114 returns the IP address to the SLC 106;

7. The SLC 106 instructs the DPFE 140 to route the call to the IP address of the called party;

8. The DPFE 140 routes the call to the IP address of the called party;

9. The called party receives the call that can then be answered or otherwise disposed.

The above description of a preferred embodiment under the present invention should not be read in a limitative manner as refinements and variations are possible without departing from the spirit of the invention. The scope of the invention is defined in the appended claims and their equivalents.

We claim:

1. A service logic controller for management of communication sessions originating in either one of a telecommunications network and a data communications network, said service logic controller including:
    a first connection point permitting to exchange data with the telecommunications network;
    a second connection point permitting to exchange data with the data communications network;
    a third connection point permitting to receive data indicative of either one of events and conditions occurring in either one of said telecommunications network and data communications network;
    a data structure including a plurality of entries, each entry including an information element indicative of a certain call disposition program, said service controller being responsive to a communication session disposition inquiry message input through either one of said first and second connection points to associate a certain entry in said data structure with the communication session disposition inquiry message and output through either one of said first and second connection points a communication session disposition instructions message in accordance with the communication session disposition program of said certain entry, said communication session disposition program being dependent upon data indicative of either one of event and condition in either one of said telecommunications network and data communications network received through said third connection point.

2. A service logic controller as defined in claim 1, wherein each entry of said data structure is associated to a user.

3. A service logic controller as defined in claim 2, comprising a fourth connection point for receiving data from the telecommunications network to alter entries in said data structure.

4. A service logic controller as defined in claim 2, comprising a fifth connection point for receiving data from the data communications network to alter entries in said data structure.

5. A service logic controller as defined in claim 4, wherein said first and second connection points connect with the telecommunications network and the data communications network, respectively, through respective gateways.

6. A service logic controller as defined in claim 5, wherein the data communications network is the Internet.

7. A service logic controller as defined in claim 6, wherein the telecommunications network includes the PSTN.

8. A service logic controller as defined in claim 7, wherein the telecommunications network includes a mobile telephone network.

9. A service logic controller for management of calls originating in a telecommunications network, said service logic controller including:
    a first connection point permitting to exchange data with the telecommunications network;
    a second connection point permitting to exchange data with the Internet;
    a data structure including a plurality of entries, each entry including an information element indicative of a certain communication session disposition program;
    said service controller being responsive to a communication session disposition inquiry message input through said first connection point to associate a certain entry in said data structure with the communication session disposition inquiry message and output through said first is connection point an instructions message indicative of a communication session disposition instruction according to the communication session disposition program of said certain entry; and said service logic controller being responsive to data received through said second connection point from the Internet to alter information elements and associated communication session disposition programs in said data structure.

10. A system for management of communications sessions originating in either one of a telecommunications network and a data communications network, said system comprising:

a service logic controller including a first and second connection points;

a first gateway for establishing an interface permitting to transfer data between said first connection point and a telecommunications network;

a second gateway for establishing an interface permitting to transfer data between said second connection point and a data communications network;

a conditions and events controller to generate data indicative of events and conditions occurring in either one of said telecommunications network and data communications network, said conditions and events controller being coupled to said service logic controller to transmit thereto said data indicative of events and conditions occurring in either one of said telecommunications network and data communications network;

a data structure in said service logic controller including a plurality of entries, each entry including an information element indicative to a certain communication session disposition program, said service controller being responsive to a communication session disposition inquiry message input through either one of said first and second gateways to associate a certain entry in said data structure with the communication session disposition inquiry message and output through either one of said first and second gateways a communication session instructions message in accordance with the communication session disposition program of said certain entry, the communication session disposition program issued by said service logic controller being dependent upon said data indicative of events and conditions occurring in either one of said telecommunications network and data communications network.

11. A system as defined in claim 10, comprising a first service logic agent for transferring data from the telecommunications network to alter information elements of said data structure.

12. A system as defined in claim 11, comprising a second service logic agent for transferring data from the data communications network to alter information elements of said data structure.

13. A system as defined in claim 12, wherein said second service logic agent resides in a node of the data communications network.

14. A system as defined in claim 13, wherein said second service logic agent is accessible from a customer premises equipment to upload data to said second service logic agent to alter an information element of said data structure.

15. A method for managing a communication session originating in either one of a telecommunications network and a data communications network, said method comprising the steps of:

providing a message indicative of an incoming communication session that originates in either one of said telecommunications network and data communications network;

suspending processing of said communication session;

accessing a data structure containing a plurality of entries, each entry including an information element indicative of a certain communication session disposition program;

receiving a data element indicative of either one of events and conditions occurring in either one of said telecommunications network and data communications network;

selecting one of the entries in said data structure on a basis at least in part of the data element indicative of either one of events and conditions occurring in either one of said telecommunications network and data communications network;

processing said communication session in accordance with the communication session disposition program of the selected entry.

16. A method for managing a communication session as defined in claim 15, wherein said data structure is supported on a service logic controller, said method comprising the step of establishing a communication between said service logic controller and a certain entity residing in either one of said telecommunications network and data communications network to obtain data from said certain entity to alter a call disposition program of a certain information element of said data structure.

17. A method for managing a communication session as defined in claim 15, comprising the step of establishing the communication between said service logic controller and the certain entity while the processing of the communication session is being suspended.

18. A method for managing a communication session as defined in claim 17, wherein said certain entity is a service agent residing in said telecommunications network.

19. A method for managing a communication session as defined in claim 17, wherein said certain entity is a service agent residing in said data communications network.

20. A method for managing a communication session as defined in claim 19, wherein the data communication network comprises the Internet.

21. A method for managing a communication session as defined in claim 15, comprising the step of generating a message indicative of a certain condition in either one of said telecommunications network and data communications network, and utilizing said message to select an information element in said data structure in determining a communication session disposition program.

22. A method for managing a communication session as defined in claim 21, comprising the step of generating a message indicative of a busy telephone line.

23. A method for managing a communication session as defined in claim 21, comprising the step of generating a message indicative of a no-answer telephone line.

24. A method for managing a communication session as defined in claim 21, comprising the step of generating a message indicative of an idle telephone line.

25. A method for managing a communication session as defined in claim 21, comprising the step of generating a message indicative of a registration of a session to an Internet-based service.

26. A method for managing a communication session as defined in claim 21, comprising the step of generating a message indicative of a VoIP call origination.

27. A method for managing a communication session as defined in claim 21, comprising the step of generating a message indicative of a personal mobile terminal registration in either one of a mobile voice and data network.

28. A method for managing a communication session as defined in claim 15, comprising the step of generating a message indicative of a condition selected from the group consisting of caller line category, calling line identification, called line identification, privacy indication, mobile set location, call type, either one of a local and long distance call and call statistics, and utilizing said message to select an information element in said data structure in determining a communication session disposition program.

29. A method for managing a telephone service to a called station coupled to the telecommunications network, said method comprising the steps of:

provided a message indicative of an incoming call to the called station;

searching a data structure in a service logic controller to determine a call disposition program associated with the called station;

processing the incoming call in accordance with the call disposition program associated with the calling station;

transferring data from a service agent residing in a network to the service logic controller;

processing the data transferred from said service agent in accordance with the call disposition program associated with the called station to generate a call disposition instruction.

30. A service logic controller for management of communication sessions originating in either one of a telecommunications network and a data communications network, said service logic controller including:

a first connection point permitting to exchange data with the telecommunications network;

a second connection point permitting to exchange data with the data communications network;

a data structure including a plurality of entries, each entry including an information element indicative of a certain call disposition program, said service controller being responsive to a communication session disposition inquiry message input through either one of said first and second connection points to associate a certain entry in said data structure with the communication session disposition inquiry message and output through either one of said first and second connection points a communication session disposition instructions message in accordance with the communication session disposition program of said certain entry.

31. A system for management of communications sessions originating in either one of a telecommunications network and a data communications network, said system comprising:

a service logic controller including a first and second connection points;

a first gateway for establishing an interface permitting to transfer data between said first connection point and a telecommunications network;

a second gateway for establishing an interface permitting to transfer data between said second connection point and a data communications network;

a data structure in said service logic controller including a plurality of entries, each entry including an information element indicative of a certain communication session disposition program, said service controller being responsive to a communication session disposition inquiry message input through either one of said first and second gateways to associate a certain entry in said data structure with the communication session disposition inquiry message and output through either one of said first and second gateways a communication session instructions message in accordance with the communication session disposition program of said certain entry.

* * * * *

UNITED STATES PATENT AND TRADEMARK OFFICE
CERTIFICATE OF CORRECTION

PATENT NO. : 6,185,565
DATED : February 6, 2001
INVENTOR(S) : Charles J. MEUBUS et al.

It is certified that error appears in the above-identified patent and that said Letters Patent is hereby corrected as shown below:

Column 12, line 64, delete "is"
Column 13, line 29, change "to" to --of--

Signed and Sealed this

Fifth Day of June, 2001

Attest:

Attesting Officer

NICHOLAS P. GODICI
*Acting Director of the United States Patent and Trademark Office*